350-357

12/12/78 XR 4,129,861 SR

United States Patent [19]

Giglia

[11] 4,129,861

[45] Dec. 12, 1978

[54] MULTIPLEX ADDRESSING OF ELECTROCHROMIC DISPLAYS

[75] Inventor: Robert D. Giglia, Rye, N.Y.

[73] Assignee: American Cyanamid Company, Stamford, Conn.

[21] Appl. No.: 652,935

[22] Filed: Jan. 27, 1976

[51] Int. Cl.$^2$ .................... G02F 1/13

[52] U.S. Cl. .................... 340/324 R; 340/336; 350/357

[58] Field of Search ....... 340/324 R, 324 M, 166 EL, 340/176, 336; 315/202; 350/160 R, 357, 160 LC

[56] References Cited

U.S. PATENT DOCUMENTS

| | | | |
|---|---|---|---|
| 2,892,968 | 6/1959 | Kallmann et al. | 340/166 EL |
| 3,609,747 | 9/1971 | Ngo | 340/324 R |
| 3,708,220 | 1/1973 | Meyers et al. | 350/160 R |
| 3,756,693 | 9/1973 | Ota | 350/160 R |
| 3,904,924 | 9/1975 | Hilsum et al. | 340/166 EL |
| 4,028,692 | 6/1977 | Ngo | 340/166 EL |

*Primary Examiner*—David L. Trafton
*Attorney, Agent, or Firm*—Robert J. Feltovic; Gordon L. Hart

[57] ABSTRACT

An electrochromic data display and imaging device which may be formed by sandwich arrangement of the imaging area and the counter-electrode area with a suitable ion-conducting layer between.

The imaging area is in the form of discrete electrochromic areas in a desired pattern, and a circuit is provided for multiplexing these areas to provide alphanumeric or other type displays.

6 Claims, 4 Drawing Figures

MULTIPLEX ADDRESSING OF ELECTROCHROMIC DISPLAYS

BACKGROUND OF INVENTION

This invention relates to electro-optical devices whose electromagnetic radiation absorption characteristics can be selectively altered by influence of a suitably controlled electric field. More particularly, the invention is concerned with an electro-optical device which as a display screen with a plurality of dscrete display elements. Still more particularly, this invention is directed to an electrochromic device including a circuit for controlling the display device equipped with an alpha-numeric or an X-Y matrix type display.

In commonly assigned, copending U.S. applications, Ser. No. 41,153, now abandoned, Ser. No. 41,154, now abandoned, and Ser. No. 41,155, now U.S. Pat. No. 3,708,220, all filed May 25, 1970, and U.S. Pat. Nos. 3,521,941 and 3,578,843, there are described electro-optical devices exhibiting a phenomenon known as persistent electrochromism wherein electromagnetic radiation absorption characteristics of a persistent electrochromic material are altered under the influence of an electric field. Such devices are employed in sandwich arrangement between two electrodes. Coloration is induced by charging the electrochromic film negative with respect to the counter-electrode, employing an external potential. The counter-electrode can be the same as the persistent electro-chromic material or different.

By reversing the original polarity of the field or by applying a new field, it is also possible to cancel, erase or bleach the visible coloration.

These steps of color induction and erasure are defined as cycling.

The devices described in the prior applications are effective to change their electromagnetic radiation transmitting properties under the influence of an electric field, but the practicality of a simple sandwiched or layered arrangement of electrodes and layer of electrochromic material is somewhat limited due to the fact that prior devices were either simple area displays or devices with separate characters.

It is therefore an object of this invention to provide an electrochromic imaging device having a plurality of discrete display areas.

A further object is to provide such an electrochromic device with means to multiplex the display.

These and other objects of the invention will become apparent as the description thereof proceeds.

SUMMARY OF THE INVENTION

The image display device is formed in a sandwich arrangement of an electrochromic layer in a desired discrete pattern as an imaging area and a common counter-electrode for the entire imaging area with a spacing of an ion conducting medium, between the areas. Means are provided for supplying electric current to the counter-electrode layer, and to the elements of the imaging area. The problem encountered in such an arrangement is that there is coloration and bleaching of undesired elements due to alternate current paths and because the threshold voltage at which coloration of each element occurs is less than about one third of the voltage required for practical addressing speed. Hence, when a specific element is sought to be colored, other adjacent elements may also fully or partially color due to this "cross-talk" effect. However, successful multiplexing is accomplished by the use of a circuit having a pair of diodes for each discrete element of the display to provide the necessary threshold voltage to color or erase each display element.

The foregoing and other features, objects and advantages of the present invention will become more apparent from the following detailed description.

DETAILED DESCRIPTION OF THE INVENTION

As used herein, a "persistent electrochromic material" is defined as a material responsive to the application of an electric field of a given polarity to change from a first persistent state in which it is essentially non-absorptive of electromagnetic radiation in a given wavelength region, to a second persistent state in which it is absorptive of electromagnetic radiation in the given wavelength region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

ELECTROCHROMIC MATERIALS

The materials which form the electrochromic materials of the device in general are electrical insulators or semi-conductors. Thus are excluded those metals, metal alloys, and other metal-containing compounds which are relatively good electrical conductors. These materials are disclosed in U.S. Pat. No. 3,521,941.

A particularly advantageous aspect in the present invention is the use of two separate layers of identical electrochromic materials one layer being employed in the counter-electrode for the other layer. A preferred embodiment consists of tungsten oxide as the electrochromic color electrode and tungsten oxide and graphite as the counter-electrode.

While the exact mechanism of persistent electrochromism may not be completey understood, the coloration is observed to occur at the negatively charged electrochromic layer. Generally, the phenomenon of persistent electrochromism is believed to involve transport of cations such as hydrogen or lithium ions to negative electrode where color centers form in the electrochromic image layer as a result of charge compensating electron flow.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compound being laid down as a film and by the film-forming method since the particular compound and film-forming method may place physical (e.g., non-uniform film surface) and economic limitations on manufacture of the devices.

The films may be laid down on any substrate which, relative to the film, is electrically conducting. The electrically conductive material may be coated on another suitable substrate material including glass, wood, paper, plastics, plaster, and the like, including transparent, translucent, opaque or other optical quality materials. A preferred embodiment in the instant device would employ at least one transparent electrode.

When tungsten oxide is employed as the electrochromic imaging material and an electric field is applied between the electrodes, a blue coloration of the previously transparent electrochromic layer occurs, i.e., the persistent electrochromic layer becomes absorptive of electromagnetic radiation over a band encompassing the red end of the visible spectrum thereby rendering the imaging layer blue in appearance. Prior to the application of the electric field, the electrochromic imaging layer is essentially non-absorbent and thus transparent.

SPACING LAYER

A semi-solid ion conductive gel may be employed. One embodiment comprises in combination sulfuric acid and a gelling material for the acid. Any gelling agent which is compatible with the other components is suitable. Particularly advantageous gelling agents are polyvinyl alcohol, polyacrylamide, sodium silicate, cabo-sil, and the like.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby, gels can be produced to give a specific conductivity in the range of from about 0.10 to 0.60 $ohm^{-1} cm^{-1}$.

A distinct advantage of the above mentioned gels is their high ionic conductivity and good chemical stability. We have found that both requirements are unexpectedly met by gels in the preferred conductivity range of 0.20–0.40 $ohm^{-1} cm^{-1}$.

Other materials may be incorporated into the gel to vary the physical properties of the gel such as viscosity and vapor pressure. Thus, the composition may optionally include organic solvents such as dimethyl formamide, acetonitrile, propionitrile butyrolactone and glycerin.

Further, the gels used in the instant invention may be made opaque with, for example, stable, white or colored pigments such as $TiO_2$ or $TiO_2$ doped with Ni, and/or Sb for use in certain electrochromic display device applications. A fluid layer containing an acid may also be used in place of the gel, as disclosed in copending, commonly assigned application Ser. No. 41,154, filed May 25, 1970, now abandoned.

The spacing layer may also be made ionically conductive by a semi-solid material such as a paste, grease or gel containing some ionically conducting materials. The dispersing medium may be one selected from a group consisting of an ionically conductive paste, grease or gel. A preferred embodiment in the present invention comprises the use of a conductive lithium stearate grease containing dispersed therein propylene carbonate and p-toluene sulfonic acid. The semi-solid medium can contain one or more salts selected from Group IA and IIA alkali or alkaline earth materials. Smaller ions such as lithium and sodium are preferred to larger ions as potassium and rubidium since ionic mobility in the electrochromic layer may be a limiting factor. The significant improvements in electrode reversibility and reproducibility and the important advantage of long term stability of operation by use of these gels were unexpected. This is a significant advantage in applications requiring long term service stability. Thus, alpha numeric character presentation and data display devices, wherein the service requirement is stated in years and/or millions of cycles, have become commercially feasible.

In addition, the spacing layer may be a solid ion permeable layer as disclosed in U.S. Pat. No. 3,521,941, for example, silicon oxide, calcium fluoride, magnesium fluoride or the like.

ADDITIVE COMPOUNDS

Compounds may be added to the electrolyte spacing layer, the same as those used in the imaging layer. Preferably, the additive compound is the same as that of the imaging layer. $WO_3$ for example, is an effective additive when using a $WO_3$ imaging layer. The additives are used in an amount to form a 50 to 100% saturated solution.

COUNTER ELECTRODE

As previously indicated, the counter-electrode may be any electrically conductive material. Particularly advantageous is a layer of electrochromic material, as described previously. It is also advantageous to use the same electrochromic material for the imaging area and counterelectrode. A mixture of graphite and an electrochromic material, or graphite alone may be used as the counter-electrode. Other metallic counter-electrodes are disclosed in copending application, Ser. No. 41,154, filed May 25, 1970, now abandoned.

The invention may be better understood by reference to the drawings in which

Figure 1:
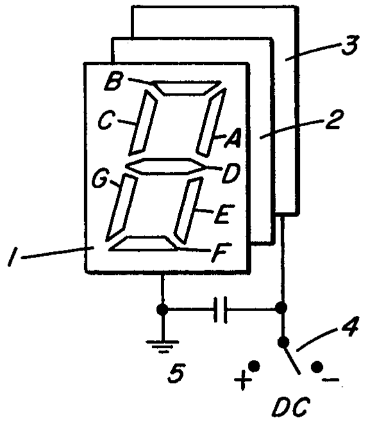
FIG. 1 is an exploded view of a single electrochromic numeric display element according to the invention.

Referring to FIG. 1, a single digit numeric display is shown which consists of an image area 1 of a transparent or translucent substrate, e.g. glass, with a transparent conductive deposit on its inner surface, such as tin oxide over areas A, B, C, D, E, F and G, and a deposit of an electrochromic material such as tungsten oxide material on the inner surface of the tin oxide to form seven separate segments. An ion conductive layer 2 is sandwiched between the display area 1 and a counter electrode 3.

A D.C. potential is applied through switch 4 to a parallel arrangement of capacitor 5 and the EC device. The capacitor is used in the circuit to improve addressing speed as disclosed in copending, commonly assigned Ser. No. 24,866, filed Oct. 26, 1973, now abandoned. The capacitor is charged in one sense and the external potential is removed. The capacitor then discharges through the EC display, coloring the display. The display is erased by applying a reversed D.C. potential and charging the capacitor in the opposite sense. The diode forward conducting voltage is added to the EC element threshold voltage to produce a total threshold voltage above one half the addressing voltage. This higher threshold voltage serves to blunt the effect of any "cross-talk" current and thus prevents undesired element response. The capacitor then serves to continue to erase the EC display after the external potential is removed. Of course, some coloring or erasing of the EC display results during the relatively short time addressing pulse but the effect is completed by the action of the capacitor over the relatively longer switching time required for the EC display. An arrangement with capacitors would require one capacitor per EC element.

To further illustrate the operation of the embodiment shown in FIG. 1, the following examples is offered. The individual segment circuits of a 5 mm high EC numeric are connected together so that all segments are colored or erased when D.C. voltage of the appropriate polarity is applied. For simplicity of illustration, only the capacitor to the "F" segment is shown, and this is connected to the counter electrode 3 which is common to all display segments. A 200 $\mu f$ capacitor is connected as shown across the device terminal circuits. In a case in which the applied potential was in the range 1.0 to 1.25 v a switching pulse time of 10 milliseconds (ms) resulted in a readable 35% contrast ratio or complete erasure depending upon polarity used. A similar test on the same EC display with the capacitor removed necessitated switching pulse time between 100 ms and 200 ms to achieve 35% contrast and complete erasures.

Figure 3:
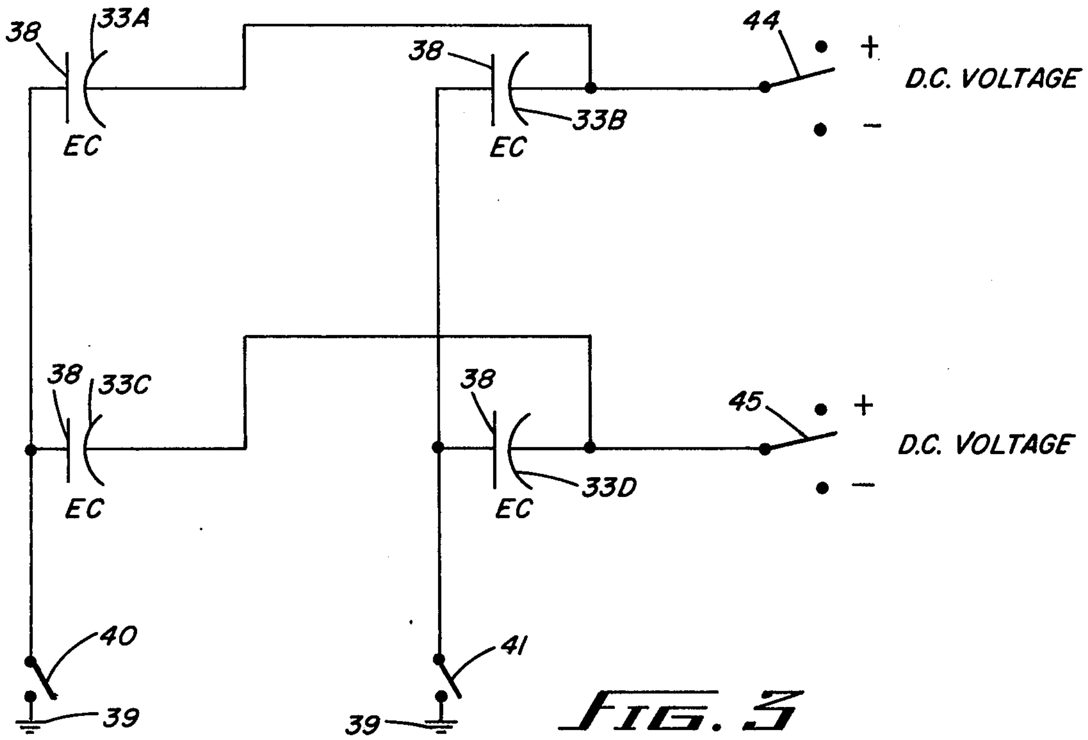
FIGS. 3 and 4 are circuits for multiplexing a plurality of EC elements.

FIG. 3 shows a circuit for multiplexing of display elements 33A, 33B, 33C and 33D which have opposed counter electrodes 38. The counter electrodes are shown connected in columns. These are connected to ground through switches 40 and 41. The EC elements are connected in rows, i.e., 33A and 33B are in parallel and connected through switch 45 to direct current voltage and 33C and 33D are in parallel connected through switch 45 to direct current voltage. When multiplexing such a display, the switches to the column are closed sequentially, which is calling scanning. The switches to the rows are closed as desired, so that a row switch is closed simultaneously with a column switch to activate the display element at the intersection of the row and column. For example, to color 33A, switch 44 is made negative simultaneously with the closing of switch 40. To erase 33A, switch 44 is made positive while switch 40 is closed. The problem encountered in such a circuit is that there is coloring and bleaching of undesired elements due to alternate current paths and because the device threshold voltage at which coloration begins is less than about one-third of the voltage required for practical addressing speed. Thus, when coloring 33A, it is also possible for current to flow in series through element 38-33C, 38-33D and 38-33B. When this occurs, 33C will color partly, 33D will undergo an erasing action and 33B will color partly. Here, two elements 33C and 33B have colored when it was not desired, and if 33D had been colored, it would have bleached partly.

Figure 4:
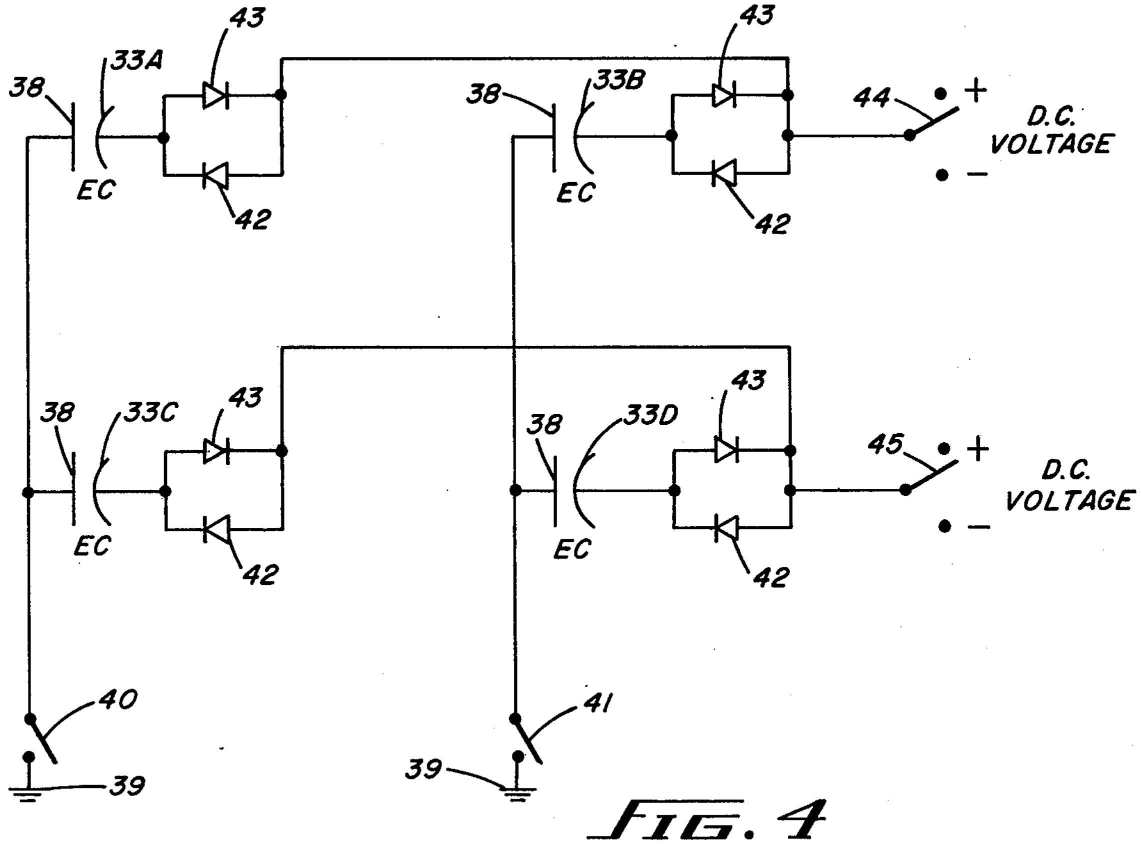

Thus it may be seen that these electrochromic display devices as described above do not possess sufficient "threshold voltage" to permit addressing in a matrix array. The problem in the circuit of the invention shown in FIG. 3 is corrected by the use of standard silicon diodes 42 and 43, as shown in FIG. 4. Normally a group of four separate electrochromic displays require a minimum of five terminals for addressing. Only four terminals are needed in the invention shown. The diode forward conducting voltage is added to the EC device voltage threshold to produce a total threshold voltage above ½ the addressing voltage. Two diodes per EC segment provide the necessary threshold voltage for both coloring and erasing. In a matrix of X elements the number of diodes is 2(X). The diodes must be inboard of the display module to take advantage of the reduced number of terminals feature.

In order to further describe the invention a group of four EC displays were connected as shown in FIG. 4. The diodes used were common silicon diodes with a forward conducting voltage rating of about 0.6 volt. A DC potential of 1.5 volts was applied with appropriate polarity to color or erase elements in less than 0.5 second. A significant amount of "cross-talk" stray coloring and erasing, was not detected. Following this demonstration the diodes were replaced by conductors and a similar switching test was performed at 1.0 volt; considerable "cross-talk" resulted. The voltage was reduced to 1.0 volt to compensate for the elimination of diode voltage drops and thereby maintain the same switching time.

Figure 2:
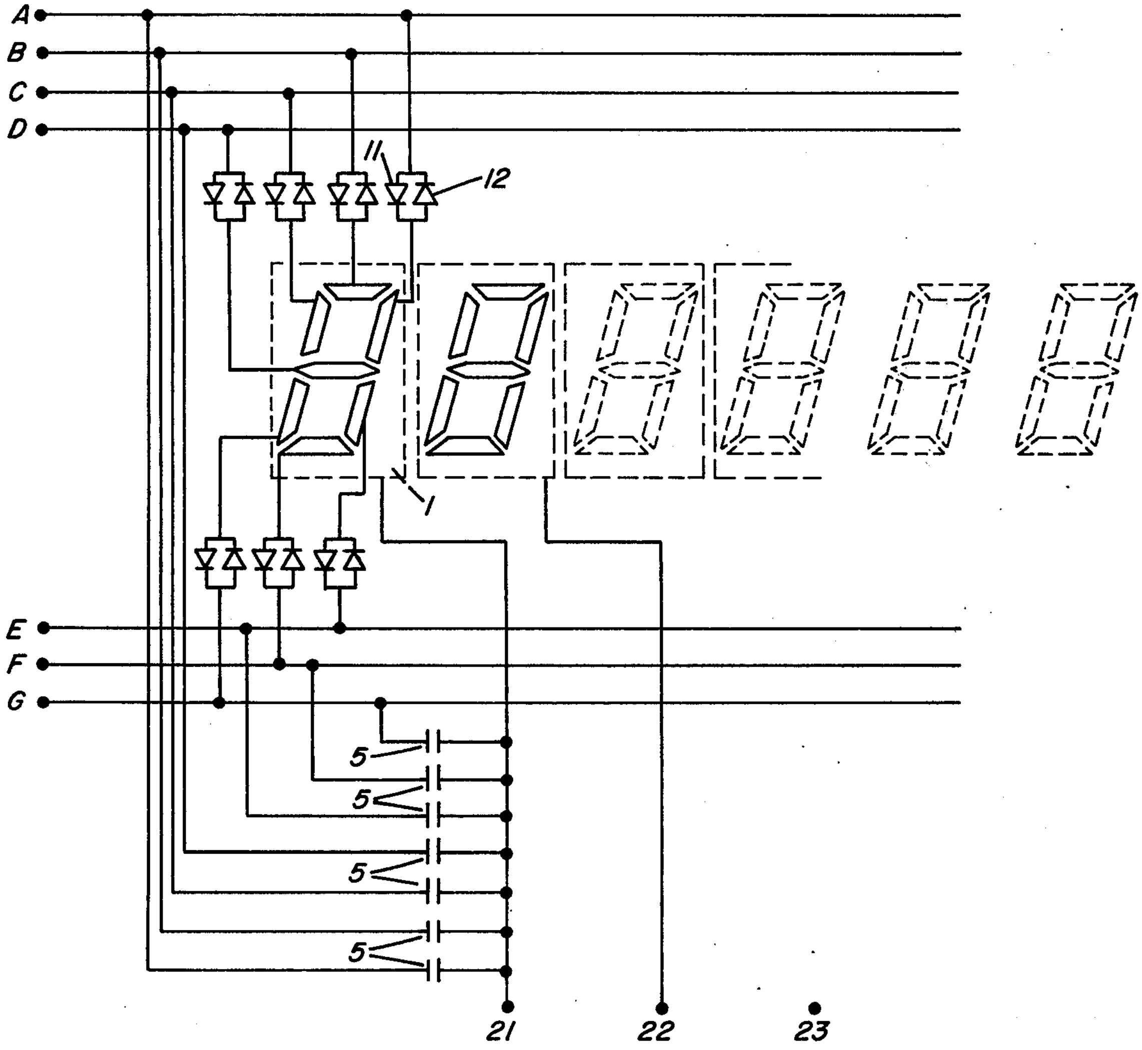
FIG. 2 is a systematic representation of a line of numeric display elements and means for addressing.

It should be understood that either the counter electrodes or the EC elements can be sequenced while the other is selectively switched. A schematic example of a multidigit single line calculator display is shown in FIG. 2. In the case of 10 digits there are 70 EC elements circuits and 10 counter-electrode element circuits but only 17 terminals are required to interface with the address unit.

The total refresh time, to erase and rewrite in this configuration is less than 400 ms with present design EC elements. Such configuration may employ two common diodes 11 and 12 per EC elements as shown and may be part of an integrated circuit or as separate semi-conductors.

The number of digits could be greater or less as desired, each digit having its own circuitry as shown for the first digit. The digit style shown is well known in the art, and the numeral "3" could be formed by activating segments B, A, D, E and F by closing the corresponding switches simultaneously with switch 21. This provides a pulse stored by the appropriate capacitors. As previously described, in sequence, each digit is given a 10 ms addressing pulse which would allow 10 digits in a line to be pulsed in 100 ms. The pulse current is stored in the capacitors and releases to color the digits. Without the use of capacitors, it would require up to 2000 ms to address the 10 digits. By addressing each digit for 10 ms only, and passing on to the next, the total time for 10 digits is 10 times 10 plus turn on time for the last digit or 200 to 300 ms. This will appear to be almost instantaneous to the eye.

It will be obvious that more than one line of digits may be used in a composite display. Moreover, other types of well known alpha-numeric displays may be used so that both letters and numerals may be displayed.

The present display system is useful for numerous types of displays such as in an electronic calculator, with appropriate calculator logic circuitry.

Other alpha-numeric applications are in watch and clock faces, automobile dashboard displays, telephone displays, aircraft instrument panels, instrument displays, large sign or panel displays—indoor and outdoor—radio or television channel displays, sports score boards, cash register displays, transportation arrival and departure displays, scales, gasoline pump indicators, public utility meters, taximeters, elevator annunciators, market quotation system, and the like.

I claim:

1. A display system comprising a plurality of persistent electrochromic display elements and means to multiplex said display elements, said means comprising diode means to provide a sufficient threshold voltage only to each display element to be displayed or erased and voltage threshold conduction means connected to each display element so that only a directly addressed element will be activated.

2. The device of claim 1 wherein said persistent electrochromic display elements comprise layered arrangements of a persistent electrochromic material and an ion-conducting medium in contact with a first electrode and a counter-electrode.

3. The device of claim 2 wherein said persistent electrochromic material is tungsten oxide.

4. The device of claim 2 wherein said ion-conducting medium is a mixture of sulfuric acid and glycerin.

5. The device of claim 2 wherein said counter-electrode comprises tungsten oxide.

6. A display means defined by claim 1 further comprising capacitor means in the supply circuit to each element in parallel with the opposed electrodes of the element.

* * * * *